(12) United States Patent
Fox et al.

(10) Patent No.: US 11,184,310 B2
(45) Date of Patent: Nov. 23, 2021

(54) SOCIAL MEDIA INFUSED RELATIONSHIP MANAGEMENT BASED ON 5G CONNECTION SPEED

(71) Applicant: International Business Machines Corporation, Armonk, NY (US)

(72) Inventors: Jeremy R. Fox, Georgetown, TX (US); Liam S. Harpur, Dublin (IE); Chris Kau, Mountain View, CA (US); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/438,292

(22) Filed: Jun. 11, 2019

(65) Prior Publication Data

US 2020/0396198 A1 Dec. 17, 2020

(51) Int. Cl.
*H04L 12/58* (2006.01)
*G06N 20/00* (2019.01)
*H04L 29/08* (2006.01)

(52) U.S. Cl.
CPC ............ *H04L 51/26* (2013.01); *G06N 20/00* (2019.01); *H04L 51/32* (2013.01); *H04L 67/10* (2013.01); *H04L 67/22* (2013.01); *H04L 67/24* (2013.01)

(58) Field of Classification Search
CPC ......... H04L 51/26; H04L 51/32; H04L 67/10; H04L 67/22; H04L 67/24; G06N 20/00
See application file for complete search history.

(56) References Cited

U.S. PATENT DOCUMENTS

| | | | |
|---|---|---|---|
| 8,874,784 B2 | 10/2014 | Agarwal et al. | |
| 2002/0107853 A1* | 8/2002 | Hofmann | G06F 16/335 |
| 2006/0285496 A1* | 12/2006 | Blackburn | H04L 47/70 370/235 |
| 2009/0138427 A1* | 5/2009 | Kalavade | G06Q 30/0205 |
| 2010/0287256 A1* | 11/2010 | Neilio | G06Q 10/10 709/217 |
| 2011/0314145 A1 | 12/2011 | Raleigh et al. | |
| 2012/0278329 A1* | 11/2012 | Borggaard | G06Q 10/00 707/738 |
| 2012/0331106 A1* | 12/2012 | Ramamurthy | H04N 21/6587 709/218 |

(Continued)

OTHER PUBLICATIONS

Anonymous, "Method and System to Invoke Mobile Application Data Communication Actions Based on Analytics of Network Environment, Financial Impact and Security Posture," IPCOM000231066D, IP.com, Sep. 25, 2013, 3 pages, United States.

(Continued)

*Primary Examiner* — John A Follansbee
*Assistant Examiner* — Raqiul A Choudhury
(74) *Attorney, Agent, or Firm* — Sherman IP LLP; Kenneth L. Sherman; Steven Laut

(57) ABSTRACT

One embodiment provides a method including monitoring social media application usage for particular users over a time period for media feeds and postings of content. Based on the monitoring, the method determines specific times to render content position, dimension sizes and flow rate. Connection speeds are distinguished for the particular users within the social media application. New social media feeds and new postings of content are dynamically reorganized and prioritized based on the connection speeds for the particular users.

20 Claims, 7 Drawing Sheets

(56) References Cited

U.S. PATENT DOCUMENTS

| | | | |
|---|---|---|---|
| 2015/0215816 A1 | 7/2015 | Abou-Elkheir et al. | |
| 2015/0256571 A1* | 9/2015 | Ueno | H04L 67/1029 709/204 |
| 2016/0127491 A1* | 5/2016 | Na | H04L 65/602 709/217 |
| 2016/0294956 A1* | 10/2016 | Fix | H04L 41/147 |
| 2019/0073697 A1* | 3/2019 | Varley | G06Q 30/0275 |
| 2019/0102396 A1* | 4/2019 | Pan | G06F 16/248 |
| 2019/0132275 A1* | 5/2019 | Kelly | H04L 65/4076 |
| 2019/0205386 A1* | 7/2019 | Kumar | G06N 5/046 |
| 2019/0238588 A1* | 8/2019 | Sites | H04L 63/1483 |

OTHER PUBLICATIONS

Koch, C., et al., "Optimizing Mobile Prefetching by Leveraging Usage Patterns and Social Information," 2014 IEEE 22nd International Conference on Network Protocols (ICNP), Oct. 21, 2014, pp. 293-295, IEEE, United States.

Mangla, T. et al., "Video Through a Crystal Ball: Effect of Bandwidth Prediction Quality on Adaptive Streaming in Mobile Environments," MOVID'16, May 2016, 6 pages, ACM, United States.

Mell, P., et al., "The NIST Definition of Cloud Computing", National Institute of Standards and Technology Special Publication 800-145, Sep. 2011, pp. 1-7, U.S. Department of Commerce, United States.

Campbell, R., "The Challenges of Adaptive Streaming," BBC Research & Development, Sep. 12, 2012, pp. 1-3, United Kingdom, downloaded from: http://www.bbc.co.uk/blogs/researchanddevelopment/2012/09/adaptive-streaming.shtml.

Qumu Blog, "The Downside Of HTTP Adaptive Bit Rate Streaming," Qumu Enterprises, Oct. 23, 2013, p. 1, downloaded from: https://www.qumu.com/blog/2013/10/23/the-downside-of-http-adaptive-bit-rate-streaming/.

Anonymous, "Downsides of HTTP adaptive bit rate streaming," Feb. 24, 2012, p. 1-3, downloaded from: https://web.archive.org/web/20170829124533/http://jet-stream.com/blog/downsides-of-http-adaptive-bit-rate-streaming/, Jet Stream BV, Netherlands.

* cited by examiner

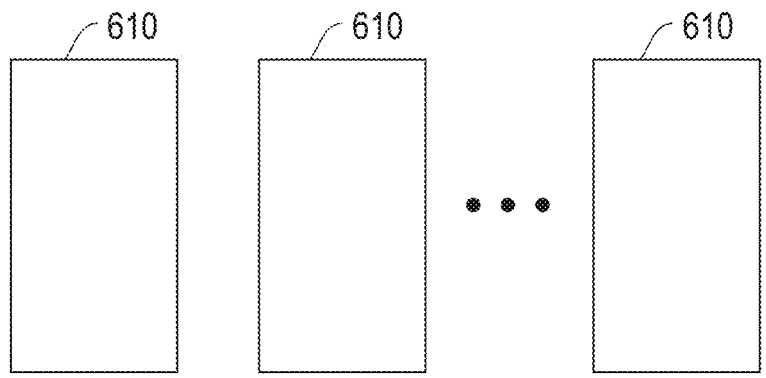
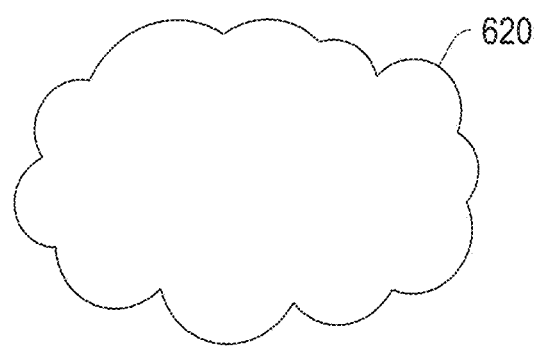
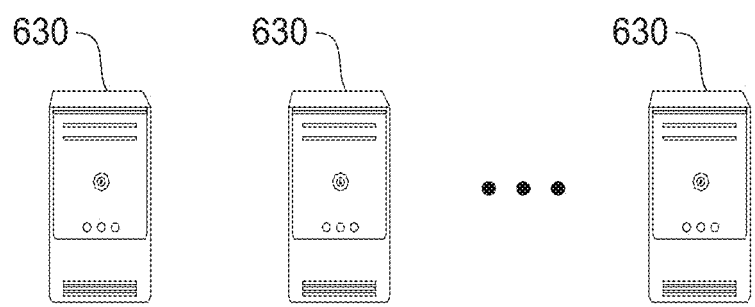
FIG. 6

SOCIAL MEDIA INFUSED RELATIONSHIP MANAGEMENT BASED ON 5G CONNECTION SPEED

BACKGROUND

Video position and dimension sizes and flow rate affect the play rate of content. The next standard (e.g., 5G wireless networks) is being deployed and will be offered by many providers in the next few years. This will cause social/relationship problems between those who have 5G and those who do not due to the massive speed discrepancy within the ability to move large amounts of data and content at extremely high speed. The exponential increase in speed will undoubtably change user behavior for those that adopt 5G.

SUMMARY

Embodiments relate to social media infused relationship management based on connection speed. One embodiment provides a method that includes monitoring social media application usage for particular users over a time period for media feeds and postings of content. Based on the monitoring, the method determines specific times to render content position, dimension sizes and flow rate. Connection speeds are distinguished for the particular users within the social media application. New social media feeds and new postings of content are dynamically reorganized and prioritized based on the connection speeds for the particular users.

These and other features, aspects and advantages of the present invention will become understood with reference to the following description, appended claims and accompanying figures.

BRIEF DESCRIPTION OF THE DRAWINGS

FIG. 6 illustrates multiple users of social media platforms with various connection speeds based on different wireless standards.

DETAILED DESCRIPTION

Figure 1:
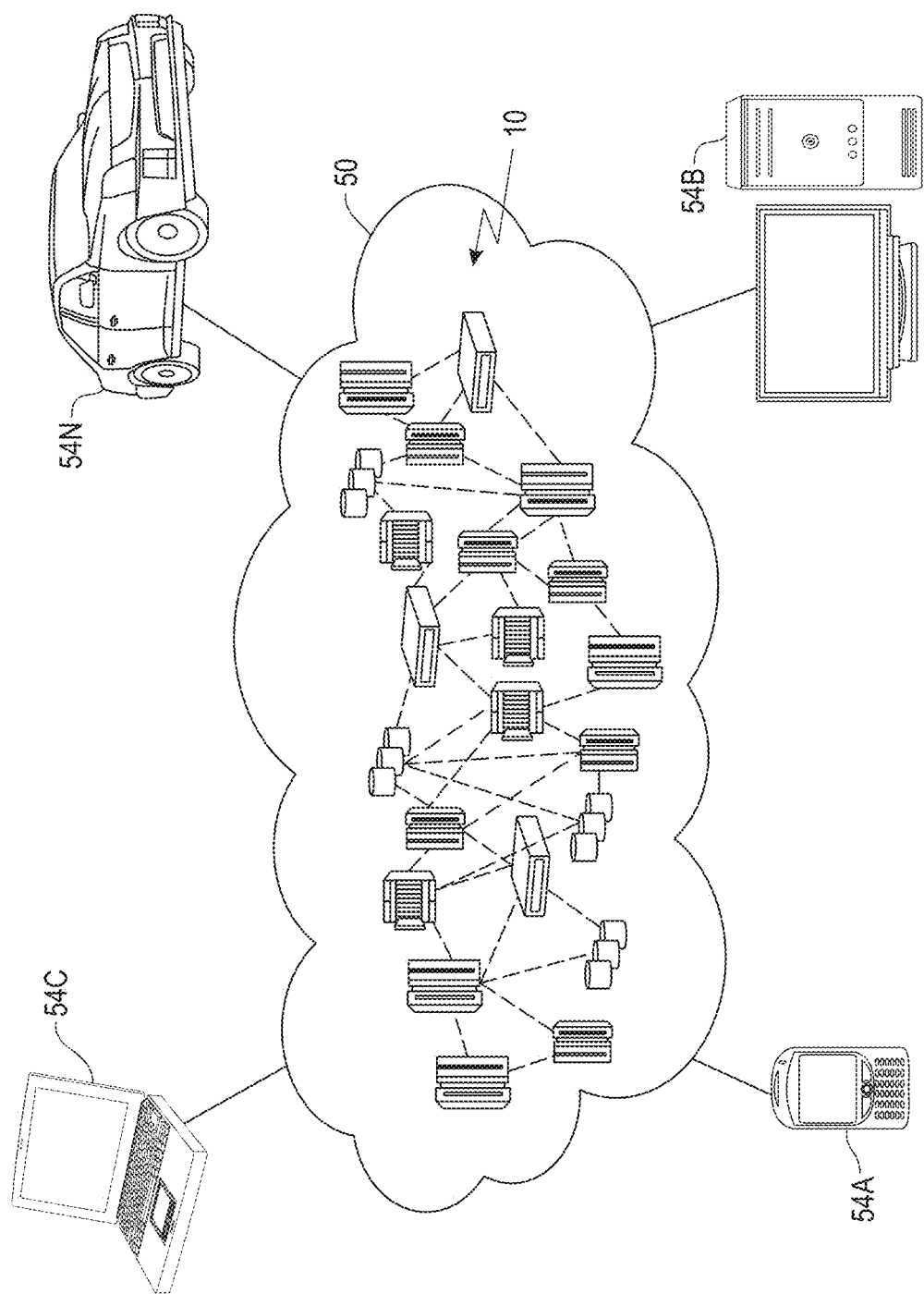
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to social media infused relationship management based on connection speed. One embodiment provides a method including monitoring social media application usage for particular users over a time period for media feeds and postings of content. Based on the monitoring, the method determines specific times to render content position, dimension sizes and flow rate. Connection speeds are distinguished for the particular users within the social media application. New social media feeds and new postings of content are dynamically reorganized and prioritized based on the connection speeds for the particular users.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
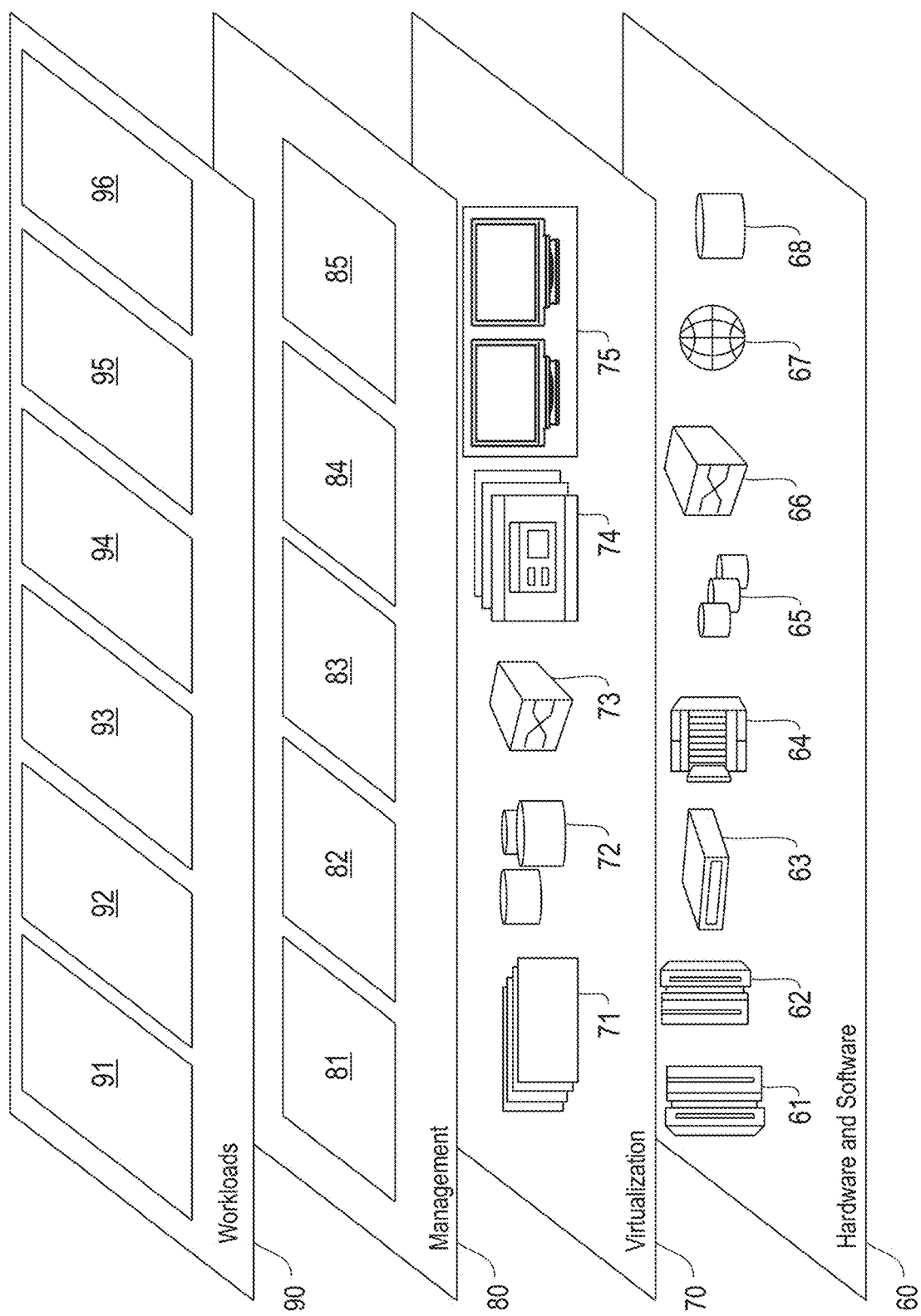
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social media infused relationship management based on connection speed processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), hardware system 400 (FIG. 4) or the cloud computing environment 50 (FIG. 1), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
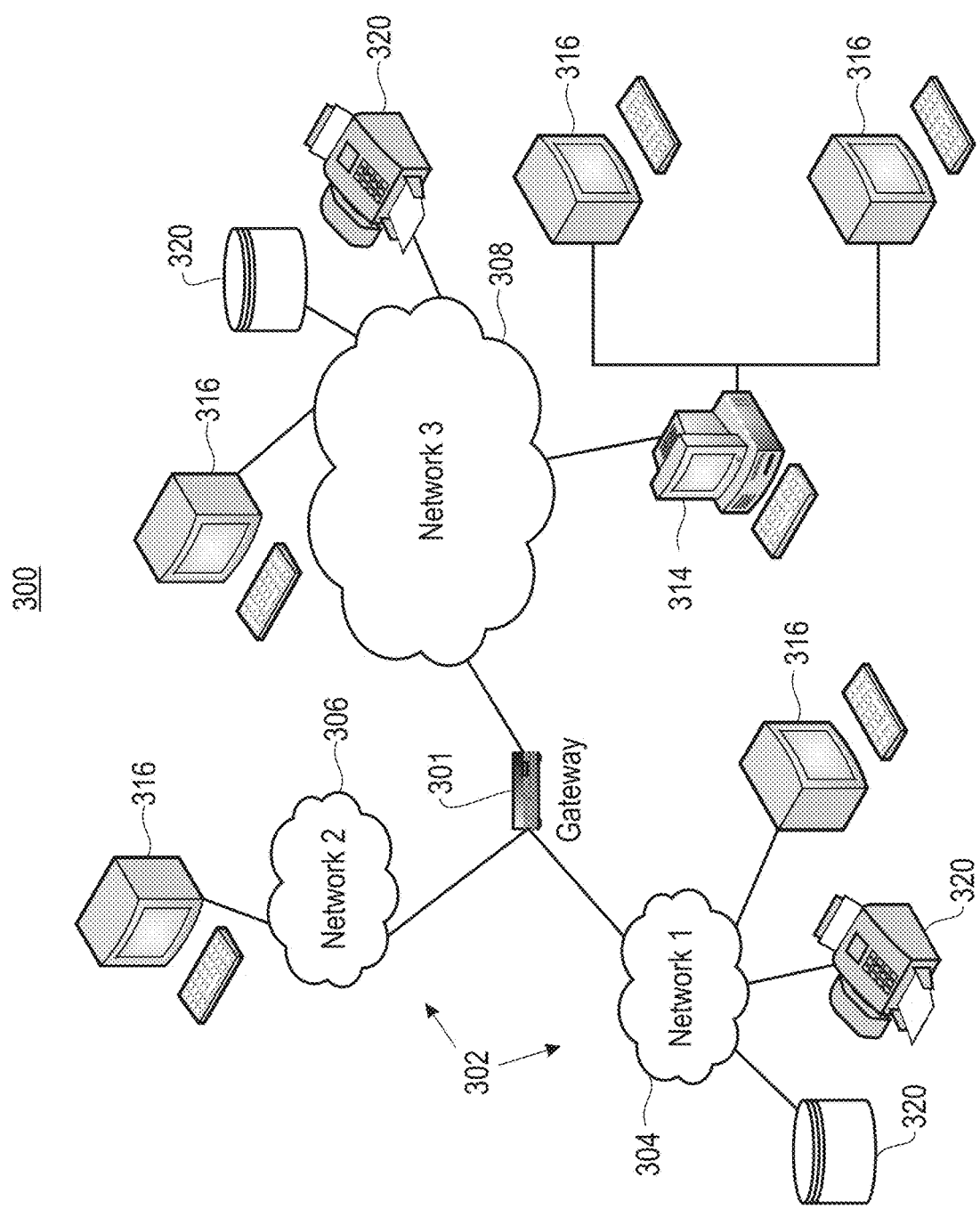
FIG. 3 is a network architecture of a system for social media infused relationship management based on connection speed, according to an embodiment.

FIG. 3 is a network architecture of a system 300 for social media infused relationship management based on connection speed, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
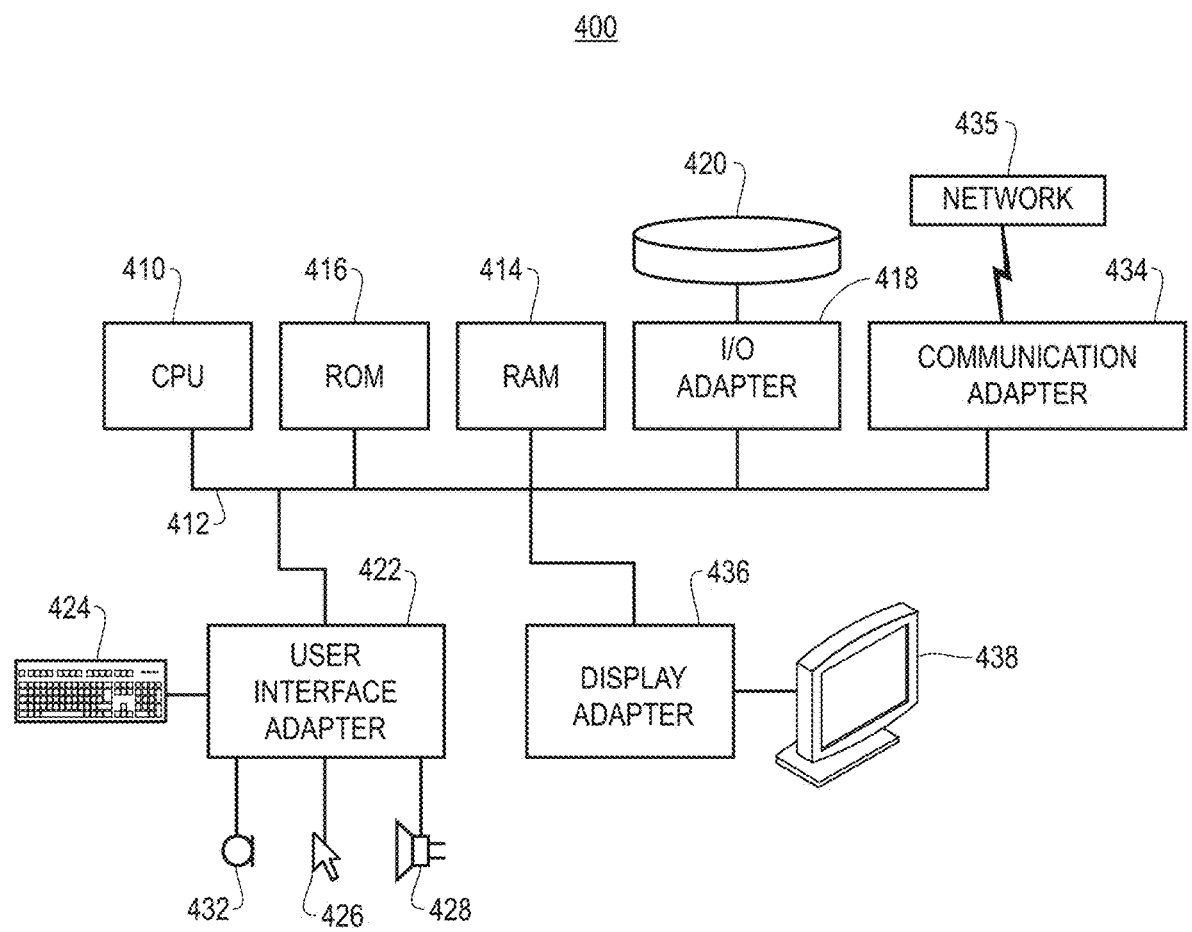
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
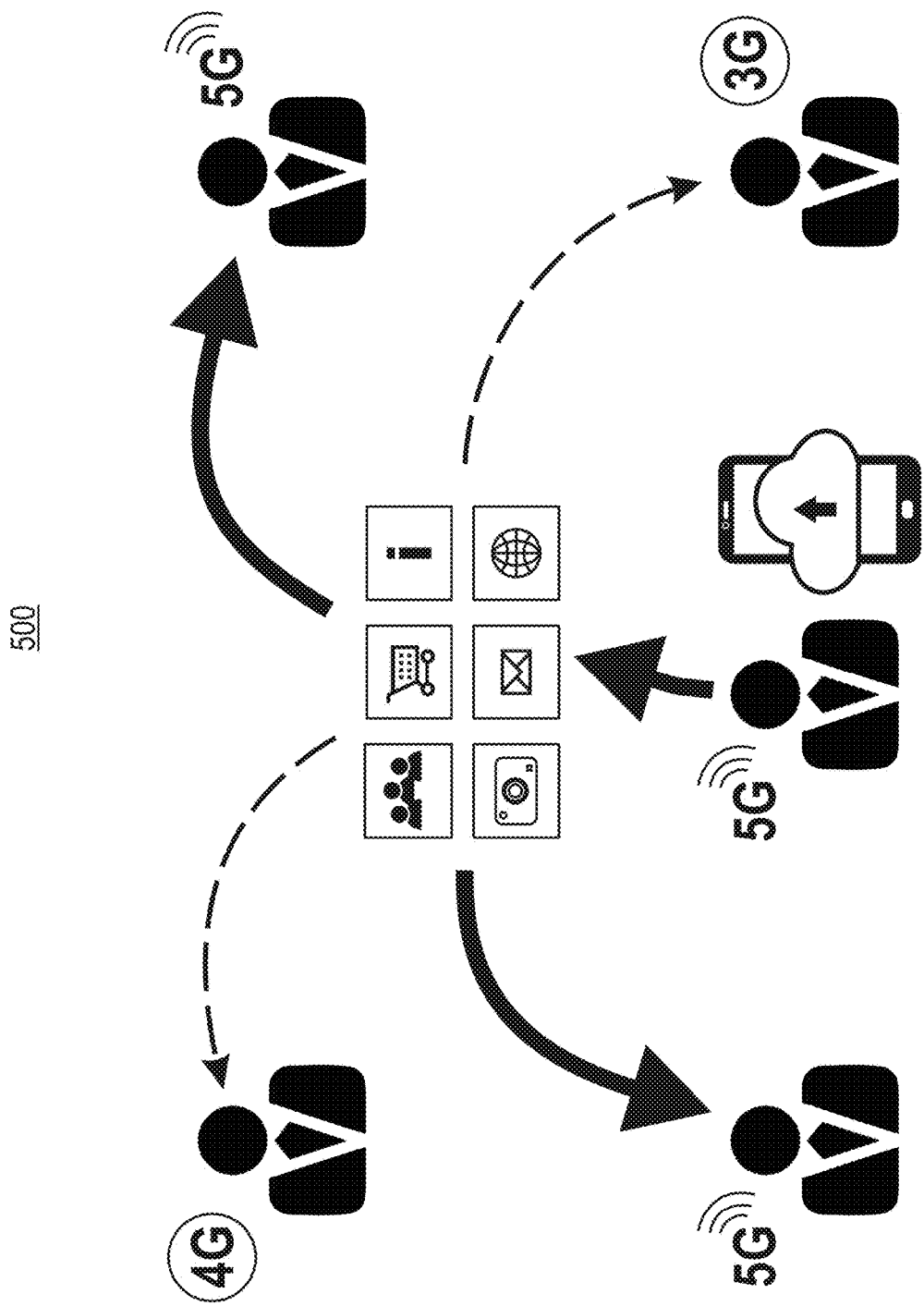
FIG. 5 is a block diagram illustrating a distributed system for social media infused relationship management based on connection speed, according to one embodiment.

FIG. 5 illustrates an example 500 of multiple users of social media platforms with various connection speeds based on different wireless standards. New networks (e.g., 5G, 6G, etc.) promise extremely high speed access to very large amounts of data and content with extremely low latency. As some users adopt higher speed connections, their data usage and sharing patterns will evolve and they will begin to readily share larger amounts of data streams, enhanced digital content, Ultra High Definition (UHD-4K) video content, etc. This will create a social media discrepancy within the ability of slower speed users to access larger amounts of content quickly and respond when using conventional slower (e.g., 3G and 4G) network connections. Social collaboration may suffer as a result within certain cases. Consider the following example. User A shares 3G content regularly on a social media platform, and user B and group C usually consume that content (e.g., they have a good relationship). Next, user A upgrades to a 5G connection and shares 5G content regularly on the social media platform. User B and group C, however, still only have 3G connections. Therefore, the good relationship between user A and user B and group C may deteriorate because now user B and group C are less inclined to use their limited data plans and suffer delays streaming the content by waiting for available Wi-Fi connections.

One or more embodiments incorporate processing that takes into account the massive bandwidth addition that 5G communications bring to the market and the transformation of the industry based on connection speed. New (5G, 6G, etc.) network capabilities (and future standards, e.g., 6G, etc.) are considered to create a new model and approach based on a latent class model. One embodiment maximizes new technologies that will change the industry, while managing the optimization of devices using past technical generations (e.g., 4G, 3G). One embodiment provides for optimizing social collaboration between older (e.g., 3G, 4G) and newer technologies (e.g., 5G, 6G, etc.) while infusing social collaboration of content.

FIG. 6 is a block diagram illustrating a system 600 that may be employed for social media infused relationship management based on connection speed, according to one embodiment. In one embodiment, the system 600 includes client devices 610 (e.g., mobile devices, smart devices, computing systems, etc.), a cloud or resource sharing environment 620 (e.g., a public cloud computing environment, a private cloud computing environment, a datacenter, etc.), and servers 630. In one embodiment, the client devices are provided with cloud services from the servers 630 through the cloud or resource sharing environment 620.

In one embodiment, system 600 provides processing that determines and understands relationships (e.g., who is most important to the user, who the current followers are and where the media is passed along and to whom, etc.). In one embodiment, this may be based on labels (i.e., friend, family, etc.), number of posts from/for, post applied tags (e.g., like, love, funny, mad, etc.), etc. System 600, based on the determined relationships, identifies touch points between network types for users. System 600 processing understands the likely bandwidth available to users at specific times (e.g., at 4 PM user D likely has access to 33 mb/s interne because user D commented on video1 after only 60 seconds). Processing in system 600 orchestrates the movement and attributes of posted videos such that there is an optimal relationship development.

In one embodiment, system 600 provides processing that monitors a user and groups over time to ascertain statistically at what specific times it is best to render video position and dimension sizes and flow rate. Processing in system 600 distinguishes user connection speeds within a social media application. One embodiment, provides processing to define bandwidth availability based upon user observed behavior (e.g., when a user logs on, uploads, downloads, etc.), establishing a user cognitive usage pattern model (e.g., using artificial intelligence (AI), neural networks (NN), machine learning, etc.). Deep NNs (DNNs) are powerful and popular learning models that achieve state-of-the-art pattern recognition performance on many computer vision, speech, and language processing tasks. For clarity, the term "network" refers to network architecture (e.g., NN architecture) that describes the transformation applied on the input, whereas "model" refers to a trained network with fixed parameters obtained by training a network on some training dataset. In some embodiments, a machine learning framework is employed.

One embodiment dynamically reorganizes and prioritizes social media feeds and postings of content (e.g., video content) based on limited data plans (e.g., plans with less bandwidth for 3G or 4G connections) for certain users or user sets. Processing in system 600 optimizes user relationship management for digital content delivery and management based on frequency of user social media interactions. In one embodiment, the processing in system 600 may be deployed on a social media platform, a user electronic device, in a cloud-based environment, etc.

In one example, consider the following use case. Extremely large file sizes will require a new approach to sharing methods and algorithms. In this example, a single minute ProRes UHD file (3840×2160) is roughly 5.3 GB (880 Mbits/s), A user would need to expand their storage/buffer and adapt their data sharing patterns if they are capturing and sharing at such high data rates. A single hour of 4K footage is about 318 GB. For data usage spread over a month, one could easily reach as high as 25 hours of 4K ProRes equaling roughly 7.76 TB.

In one embodiment, processing for social media infused relationship management based on connection speed includes monitoring a user and groups over time to ascertain statistically at what specific times it is best to render video position and dimension sizes and flow rate. For example, the processing collects/obtains context information regarding logon/logoff times, when files are uploaded/downloaded, interactions, etc. The system 600 processing monitors a user and groups over time to ascertain statistically at what specific times it is best to render video position and dimension sizes and flow rate. For example, a determination by system 600 processing for 401 pixels, 600 pixels and 720 p is best for user B at 3 PM because that user will likely be using an electronic device (e.g., a smart phone, computing device, etc.) with the relevant capability at that time based on a certain connection speed and other variables, as described below.

One embodiment generates or derives a latent class model based on: posting time, content size, position of content on browser page, device type: tablet, laptop, mobile device (e.g., a smartphone), etc., flow rate based on user connection speed (e.g., 3G, 4G, 5G, 6G, etc.), etc. The outcome is based on each unique user derived class model. In one embodiment, the processing of system 600 next distinguishes user connection speeds within a social media application/platform. In one embodiment, the processing defines upload time based upon an applications' ability to capture the upload and download timestamp(s) and the total size of the file. The connection speed can be inferred by the social media application. In one example embodiment, to determine upload time, the following may be used by the processing in system 600: $X-Y=Z$, where X=completing upload timestamp, Y=starting upload timestamp and Z=number of seconds required for total file completion. For example, X=12:56:48, Y=12:56:24 and Z=24 seconds.

In one embodiment, the processing in system 600 determines average total speed C based on the known upload time Z and the total file size A using the equation: $A/Z=C$. For example: A=237.6 GB, Z=24 seconds, so C=9.9 GB/s. Therefore, an assumption may be derived that the user is using a 5G connection on their smartphone based on the fast upload speed of 9.9 GB/s. Certain data sizes can easily be established as being extremely large files that would denote them for marking as applicable 5G sized content. In one embodiment, users can be tagged as 3G, 4G, 5G, and even 6G in the future based on the overall relative speed across a defined distribution. Users can further be compared and categorized as differing user speeds based on this analysis. In one embodiment, the processing in system 600 defines bandwidth availability based upon user observed behavior, and generating a learned user cognitive usage pattern model. Users can further be compared and categorized as differing user speeds based on this analysis.

In one embodiment, the processing in system 600 includes dynamically reorganizing and prioritizing social media feeds and postings of content based on limited data plans for certain user sets. Once the availability of known connection(s) speed has been defined, the system 600 processing prioritizes the posting of large content (e.g., 5G) and holds such content until the user has an available Wi-Fi connection established and in use. Previewing functions are established for the social media content being shared denoting (e.g., tagging, etc.) them as UHD/5G type content that would notify the user of the extremely large type of data/content. In one embodiment, processing in system 600 toggles 5G content: The ability to toggle the large content on/off is fully automated based on the ability of someone establishing the Wi-Fi connection automatically.

In one embodiment, optimizing user relationship management for digital content delivery and management is based on a user's frequency of social media interactions. The processing uses a machine learning model to understand user relationships (who is most important, who the current followers are and where the media is passed along and to whom). This identifies touch points between network types for users. These touch points can be viewed by both the person sharing and the person viewing the shared content. The touch points serve as a digital roadmap for dynamically displaying who can view the posting user's content dynamically in real time. In one embodiment, the processing provides for the posting user to understand who has an optimized high speed 5G connection to view their content and also identifies users with slower connections (e.g., until Wi-Fi networks can be reached for those users). In one embodiment, the processing in system 600 provides the ability to mark certain users (e.g., tagging, assigning a variable, etc.) within the social media network for higher priority sharing regardless of time, date, speed, or any other factor, thus outweighing the predefined model based on speed driven network analysis.

Figure 7:
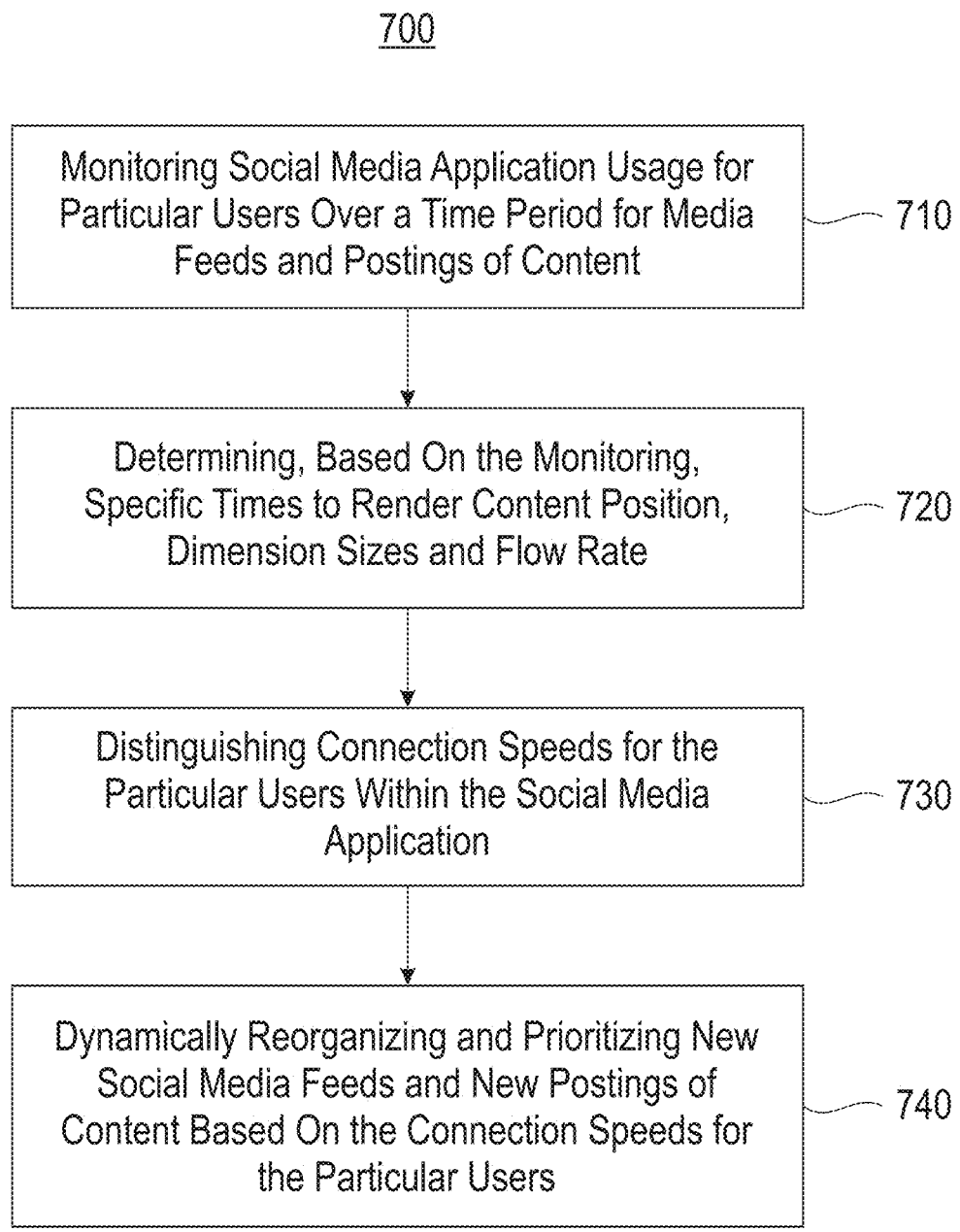
FIG. 7 illustrates a block diagram of a process for social media infused relationship management based on connection speed, according to one embodiment.

FIG. 7 illustrates a block diagram for process 700 for multiple users of social media platforms with various connection speeds based on different wireless standards, according to one embodiment. In block 710, process 700 monitors social media application usage for particular users (e.g., a set of users, a group of users, a set or group of friends or family members, etc.) over a time period (e.g., a default time, a block of hours, a day, a week, a month, etc.) for media feeds and postings of content, such as video content (e.g., by a processor from computing node 10, FIG. 1, hardware and software layer 60, FIG. 2, processing system 300, FIG. 3, system 400, FIG. 4, system 600, FIG. 6, etc.). In block 720, process 700 determines, based on the monitoring, specific times to render content position, dimension sizes and flow rate. In block 730, the process 700 distinguishes connection speeds for the particular users within the social media application. In block 740, the process 700 dynamically reorganizes and prioritizes new social media feeds and new postings of content based on the connection speeds for the particular users.

In one embodiment, process 700 may further include optimizing user relationship management for digital content delivery and management based on frequency of social media interactions for the particular users. In one embodiment, at least one connection speed for at least one of the particular users is associated with a slower connection standard (e.g., 3G or 4G) than other particular users (e.g., 5G, 6G, etc.).

In one embodiment, process 700 may further include generating a latent class model for each user based on: posting time, content size, position of content on a browser page, device type, and flow rate based on user connection speed. In one embodiment, process 700 further includes tagging the particular users based on the overall relative speed across a defined distribution. In one embodiment, process 700 may include defining bandwidth availability for the particular users based upon usage behavior of the social media application; and generating a machine learning user cognitive usage pattern model.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   monitoring social media application usage for particular users over a time period for media feeds and postings of content;
   determining, based on the monitoring, specific times that are ascertained statistically to render content position, dimension sizes and flow rate;
   distinguishing connection speeds for the particular users within the social media application based on file size, upload and download timestamps;
   optimizing user relationship management for digital content delivery and management based on using machine learning for frequency of social media interactions for the particular users including particular user relationship importance, particular followers and where content is shared;
   dynamically reorganizing and prioritizing new social media feeds and new postings of content based on limited data plans for the particular users; and
   dynamically toggling distribution of particular sized content files for content delivery of the prioritized new social media feeds and new postings for the particular users based on file size and wireless network connection.

2. The method of claim 1, wherein:
   the optimizing user relationship management for digital content delivery and management provides a digital roadmap for dynamically displaying the particular users that have the limited data plans and ability to view a posting user's content dynamically.

3. The method of claim 2, wherein at least one connection speed for at least one of the particular users is associated with a slower connection standard than other particular users having a 5G connection standard, and the optimizing user relationship management for digital content delivery and management further provides current information to a posting user including those particular users having connection speeds that are higher than other users.

4. The method of claim 2, wherein the content comprises video content, and the particular users that have the particular connection speed ability to view the posting user's content have 5G network connection speed.

5. The method of claim 1, further comprising:
   generating a latent class model for each user based on: posting time, content size, position of content on a browser page, device type being used, and flow rate based on user connection speed;
   wherein the particular users with limited data plans belong to one or more user sets.

6. The method of claim 1, further comprising:
   tagging the particular users based on the overall connection speed across a defined distribution for higher priority sharing of content regardless of time, date and the overall connection speed.

7. The method of claim 6, further comprising:
   defining bandwidth availability for the particular users based upon usage behavior of the social media application; and
   generating a machine learning user cognitive usage pattern model comprising neural networks,
   wherein tagging the particular users comprises marking the particular users as one of a 3G, 4G and 5G user based on the overall relative speed across the defined distribution, and bandwidth availability for the particular users is based upon user observed behavior and the generated machine learning user cognitive usage pattern model.

8. A computer program product for social media infused relationship management based on connection speed, the computer program product comprising a non-transitory computer readable storage medium having program instructions embodied therewith, the program instructions executable by a processor to cause the processor to:
monitor, by the processor, social media application usage for particular users over a time period for media feeds and postings of content;
determine, by the processor, based on the monitoring, specific times that are ascertained statistically to render content position, dimension sires and flow rate;
distinguish, by the processor, connection speeds for the particular users within the social media application based on file size, upload and download timestamps;
optimize, by the processor, user relationship management for digital content delivery and management based on using machine learning for frequency of social media interactions for the particular users including particular user relationship importance, particular followers and where content is shared;
dynamically reorganize and prioritize, by the processor, new social media feeds and new postings of content based on limited data plans for the particular users; and
dynamically toggle, by the processor, distribution of particular sized content files for content delivery of the prioritized new social media feeds and new postings for the particular users based on file size and wireless network connection.

9. The computer program product of claim 8, wherein the optimization of user relationship management for digital content delivery and management provides a digital roadmap for dynamically displaying the particular users that have the limited data plans and ability to view a posting user's content dynamically.

10. The computer program product of claim 9, wherein at least one connection speed for at least one of the particular users is associated with a slower connection standard than other particular users having a 5G connection standard, the content comprises video content, and the optimization of user relationship management for digital content delivery and management further provides current information to a posting user including those particular users having connection speeds that are higher than other users.

11. The computer program product of claim 10, wherein the program instructions executable by the processor further to cause the processor to:
generate a latent class model for each user based on: posting time, content size, position of content on a browser page, device type being used, and flow rate based on user connection speed;
wherein the particular users with limited data plans belong to one or more user sets.

12. The computer program product of claim 10, wherein the program instructions executable by the processor further to cause the processor to:
tag the particular users based on the overall connection speed across a defined distribution for higher priority sharing of content regardless of time, date and the overall connection speed.

13. The computer program product of claim 10, wherein the program instructions executable by the processor further to cause the processor to:
define bandwidth availability for the particular users based upon usage behavior of the social media application.

14. The computer program product of claim 12, wherein:
the program instructions executable by the processor further to cause the processor to:
generate a machine learning user cognitive usage pattern model comprising neural networks;
the particular users that have the particular connection speed ability to view the posting user's content have 5G network connection speed;
tagging the particular users comprises marking the particular users as one of a 3G, 4G and 5G user based on the overall relative speed across the defined distribution; and
bandwidth availability for the particular users is based upon user observed behavior and the generated machine learning user cognitive usage pattern model.

15. An apparatus comprising:
a memory configured to store instructions; and
a processor configured to execute the instructions to:
monitor social media application usage for particular users over a time period for media feeds and postings of content;
determine, based on the monitoring, specific times that are ascertained statistically to render content position, dimension sizes and flow rate;
distinguish connection speeds for the particular users within the social media application based on file size, upload and download timestamps;
optimize user relationship management for digital content delivery and management based on using machine learning for frequency of social media interactions for the particular users including particular user relationship importance, particular followers and where content is shared;
dynamically reorganize and prioritize new social media feeds and new postings of content based on limited data plans for the particular users; and
dynamically toggle distribution of particular sized content files for content delivery of the prioritized new social media feeds and new postings for the particular users based on file size and wireless nets network connection.

16. The apparatus of claim 15, wherein the optimization of user relationship management for digital content delivery and management provides a digital roadmap for dynamically displaying the particular users that have the limited data plans and ability to view a posting user's content dynamically.

17. The apparatus of claim 16, wherein at least one connection speed for at least one of the particular users is associated with a slower connection standard than other particular users having a 5G connection standard, the content comprises video content, and the optimization of user relationship management for digital content delivery and management further provides current information to a posting user including those particular users having connection speeds that are higher than other users.

18. The apparatus of claim 15, wherein the processor is further configured to execute the instructions to:
generate a latent class model for each user based on: posting time, content size, position of content on a browser page, device type being used, and flow rate based on user connection speed;
wherein the particular users with limited data plans belong to one or more user sets.

19. The apparatus of claim 15, wherein the processor is further configured to execute the instructions to:
- tag the particular users based on the overall connection speed across a defined distribution for higher priority sharing of content regardless of time, date and the overall connection speed.

20. The apparatus of claim 19, wherein:
- the processor is further configured to execute the instructions to:
  - define bandwidth availability for the particular users based upon usage behavior of the social media application; and
  - generate a machine learning user cognitive usage pattern model comprising neural networks; and
- the particular users that have the particular connection speed ability to view the posting user's content have 5G network connection speed;
- tagging of the particular users comprises marking the particular users as one of a 3G, 4G and 5G user based on the overall relative speed across the defined distribution; and
- bandwidth availability for the particular users is based upon user observed behavior and the generated machine learning user cognitive usage pattern model.

* * * * *